United States Patent
Nandy et al.

(10) Patent No.: US 11,546,185 B2
(45) Date of Patent: Jan. 3, 2023

(54) MULTICAST ROUTE SUMMARIZATION

(71) Applicant: HEWLETT PACKARD ENTERPRISE DEVELOPMENT LP, Houston, TX (US)

(72) Inventors: Tathagata Nandy, Bangalore (IN); David Corrales Lopez, Heredia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/221,812

(22) Filed: Apr. 4, 2021

(65) Prior Publication Data

US 2021/0336814 A1 Oct. 28, 2021

(30) Foreign Application Priority Data

Apr. 27, 2020 (IN) .............................. 202041017883

(51) Int. Cl.
*H04L 12/18* (2006.01)
*H04L 45/00* (2022.01)
*H04L 45/745* (2022.01)

(52) U.S. Cl.
CPC .......... *H04L 12/1886* (2013.01); *H04L 45/38* (2013.01); *H04L 45/745* (2013.01)

(58) Field of Classification Search
CPC ... H04L 12/1886; H04L 45/38; H04L 45/745; H04L 45/74591; H04L 45/00; H04L 45/16; H04L 47/24; H04L 47/2441; H04L 47/2483

See application file for complete search history.

(56) References Cited

U.S. PATENT DOCUMENTS

| | | | |
|---|---|---|---|
| 6,118,760 A * | 9/2000 | Zaumen | G06F 16/90339 370/428 |
| 9,385,936 B2 | 7/2016 | Bisdikian | |
| 10,097,467 B1 | 10/2018 | Singh | |
| 10,181,999 B2 | 1/2019 | Jayaraman et al. | |
| 10,432,757 B1 | 10/2019 | Sajassi et al. | |
| 2002/0097677 A1* | 7/2002 | Hoar | H04L 47/31 370/386 |

(Continued)

FOREIGN PATENT DOCUMENTS

| CN | 100473051 C | 3/2009 |
|---|---|---|
| WO | WO-2019043719 A1 | 3/2019 |

OTHER PUBLICATIONS

Citrix Systems, Inc., "Route Summarization," Dec. 13, 2019. https://docs.citrix.com/en-us/netscaler-sd-wan/10/routing/route-summarization.html.

*Primary Examiner* — Mohamed A Kamara
(74) *Attorney, Agent, or Firm* — Hewlett Packard Enterprise Patent Department (57) ABSTRACT

Examples include receiving a first multicast packet, determining a first flow for the first multicast packet based on a multicast protocol, and storing the first flow in a routing table. The first flow comprises a first source and a first group and the routing table comprises a second flow with a second source and the first group. Additionally, examples include programming the first flow into a hardware memory resource and programming a summary flow into the hardware memory resource. The hardware memory resource comprises the second flow and the summary flow comprises a wild character that matches the first source and the second source.

18 Claims, 5 Drawing Sheets

(56) References Cited

U.S. PATENT DOCUMENTS

| | | | |
|---|---|---|---|
| 2005/0195816 A1* | 9/2005 | Sumiyoshi | H04L 12/18 |
| | | | 370/390 |
| 2013/0230047 A1* | 9/2013 | Subrahmaniam | H04L 47/2441 |
| | | | 370/392 |
| 2017/0126790 A1* | 5/2017 | Mortsolf | G06F 9/45558 |

* cited by examiner

MULTICAST ROUTE SUMMARIZATION

BACKGROUND

Networking devices (e.g., switches, routers, etc.) may handle different types of data packets, including unicast data packets and multicast data packets. A multicast data packet may use an internet protocol (IP) address as a proxy for a group of devices (e.g., a a group). This multicast group IP address may not correspond to a device (e.g., physical device, virtual machine, etc.) on the network. Instead, devices in the network subscribe to the multicast group IP address and the data packets sent to the multicast group IP addresses are routed to the devices using the networking devices. Accordingly, networking devices may use multicast specific processes (multicast protocols) to handle and route the multicast data packets.

BRIEF DESCRIPTION OF THE DRAWINGS

The following detailed description references the drawings, wherein.

DETAILED DESCRIPTION

A multicast protocol (e.g., implemented by instructions stored on a non-transitory machine-readable storage medium executable by a processing resource, etc.) may determine the routing of multicast data packets received by the networking device. The multicast protocol may determine which port of the networking device should be used to forward a multicast data packet through such that the data packet is sent to an accurate next hop networking device on its path to a member device in a multicast group IP. The multicast protocol may determine this information based on an understanding of its neighbors (i.e., connected networking devices that also implement the same multicast protocol), what multicast group path the networking device is a "hop" in, etc. The multicast protocol may update an internal memory accessible only to the protocol (for example, in a routing table) to capture these determinations (i.e. flows).

The multicast protocol may interact with other components of the networking device to "transfer" its determinations. For example, the networking device may have hardware components (e.g., Application Specific Integrated Circuit (ASIC), etc.) that handles the forwarding of the data packets based on directions set by the multicast protocol. The first time a specific type of data packet is received by the networking device, the hardware component may look to see whether the multicast protocol has previously given directions on this specific type of data packet. Based on directions being present (e.g., in a table, etc.), the hardware component may independently (e.g., without the involvement of the multicast protocol) forward the data packet according to the directions. However, if the hardware component does not have directions for the specific type of data packet, the data packet is missed and the routing of that type of data packet is then determined by the multicast protocol. The multicast protocol may determine the flow of the packet within the networking device and store the flow in a table. This information may also be sent to the hardware component such that the hardware component programs the information into a hardware memory resource. Accordingly, the next time the specific type of multicast data packet is received, the hardware component knows how to route the multicast data packet. The storing of routing flows in a hardware component, such as an ASIC, allows for faster processing of a multicast data packet as compared to processing it through the multicast routing protocol.

A computing device, such as a mobile device, may have applications running on it that uses services provided by another computing device on a local network. For example, these services may include television streaming services (e.g., Chrome Cast), speakers (e.g., SONOS), printing services, webcams, etc. When the computing device accesses the local network, these applications may try to discover the services by sending multicast data packets into the network. The multicast data packets are ultimately received by a networking device in the network and routed by the networking device to the appropriate device in the network.

A computing device may have numerous applications that rely on the services on the network. Once a computing device accesses the network, the applications on the computing device may each send out multicast data packets to discover the services. These packets may be sent over a short period time, Additionally, at a given time, there may be numerous devices accessing the network at the same time. This results in a large amount of multicast data packets being sent into the network at over a short period of time.

To route these multicast data packets, a networking device may have to expend a large portion of its multicast routing resources. This is especially true when a flow is stored in a hardware component of the networking device as a hardware component may have limited memory resources for storage. In a multicast protocol, each entry in a hardware memory resource table may have various fields, including: an incoming interface, a source, a group, and an outgoing interface. An entry that varies in just one of those fields from another entry is stored in a separate entry and takes up additional space on the hardware component.

For example, one packet may originate from a different source as another packet but may come from the same incoming interface, subscribe to the same group, and go to the same outgoing interface as the other packet. These packets may be routed similarly by the hardware component but the flows for the packets are stored in two separate table entries, taking up more space in the memory resource of the hardware component. In an environment where there may be numerous amount of sources using the interfaces and subscribing to the same groups, multicast resources may be used up unnecessarily to store flows that are treated similarly by the hardware. This represents an unnecessary waste of memory resources with limited packet processing benefit.

Examples disclosed herein address these technological issues by writing a multicast summary flow in a memory resource of a hardware component (e.g., an ASIC, etc.) of a networking device. The summary flow summarizes individual multicast flows determined by a multicast protocol. Each individual flow captured by the summary flow is for processing packets coming in the networking device at the same incoming interface, that subscribe to the same group, and that are sent out from the same outgoing interface. Each flow, however, is for the processing of packets from different sources, Thus, the summary flow may "match" several different sources and allow the networking device to process packets that come from many different sources but are handled in a similar manner by the hardware component. Examples disclosed herein also include deleting the individual flows from the hardware component. Accordingly, the hardware resource may handle these packets with just one summary flow instead of the multiple individual flows. This conserves hardware resources and allows those resources to be deployed in handling other types of multicast data packets. This is especially true in situations where multiple applications are searching for network service. Having one flow for these types of multicast packets may leave room on the memory resource of the hardware component for other types of multicast packets.

In some examples, a computing device is provided with a non-transitory machine-readable storage medium. The non-transitory machine-readable storage medium includes instructions, that when executed, receive a first multicast packet and determine a first flow for the first multicast packet based on a multicast protocol. The first flow may include a first source and a first group. The storage medium may include instructions, that when executed, store the first flow in a routing table that includes a second flow, program the first flow into a hardware memory resource, and program a summary flow into the hardware memory resource. The second flow may include a second source and the first group and is also stored in the hardware memory resource. The summary flow includes a wild character that matches the first source and the second source.

In some examples, a networking device is provided with a multicast protocol engine, a hardware memory resource, and a hardware programming engine. The multicast protocol engine is to receive a first multicast packet, determine a first flow for the first multicast packet, and store the first flow in a routing table. The first flow may include a first group and the routing table may already include a second flow with the first group. The hardware programming engine is to determine the first flow and the second flow belong in a summary flow and to write the summary flow to the hardware memory resource.

In some examples, a method includes receiving a first multicast packet, determining a first flow for the first multicast packet based on a multicast protocol, and storing the first flow in a routing table. The first flow comprises an incoming interface, a first source, and a first group. The method also includes programming the first flow into a hardware memory resource, determining the incoming interface of the first flow matches an incoming interface of the second flow, determining the first group of the first flow matches a group of the second flow, programming a summary flow into the hardware memory resource and deleting the first flow from the hardware memory resource. The summary flow includes the incoming interface of the first flow and the first group.

Figure 1:
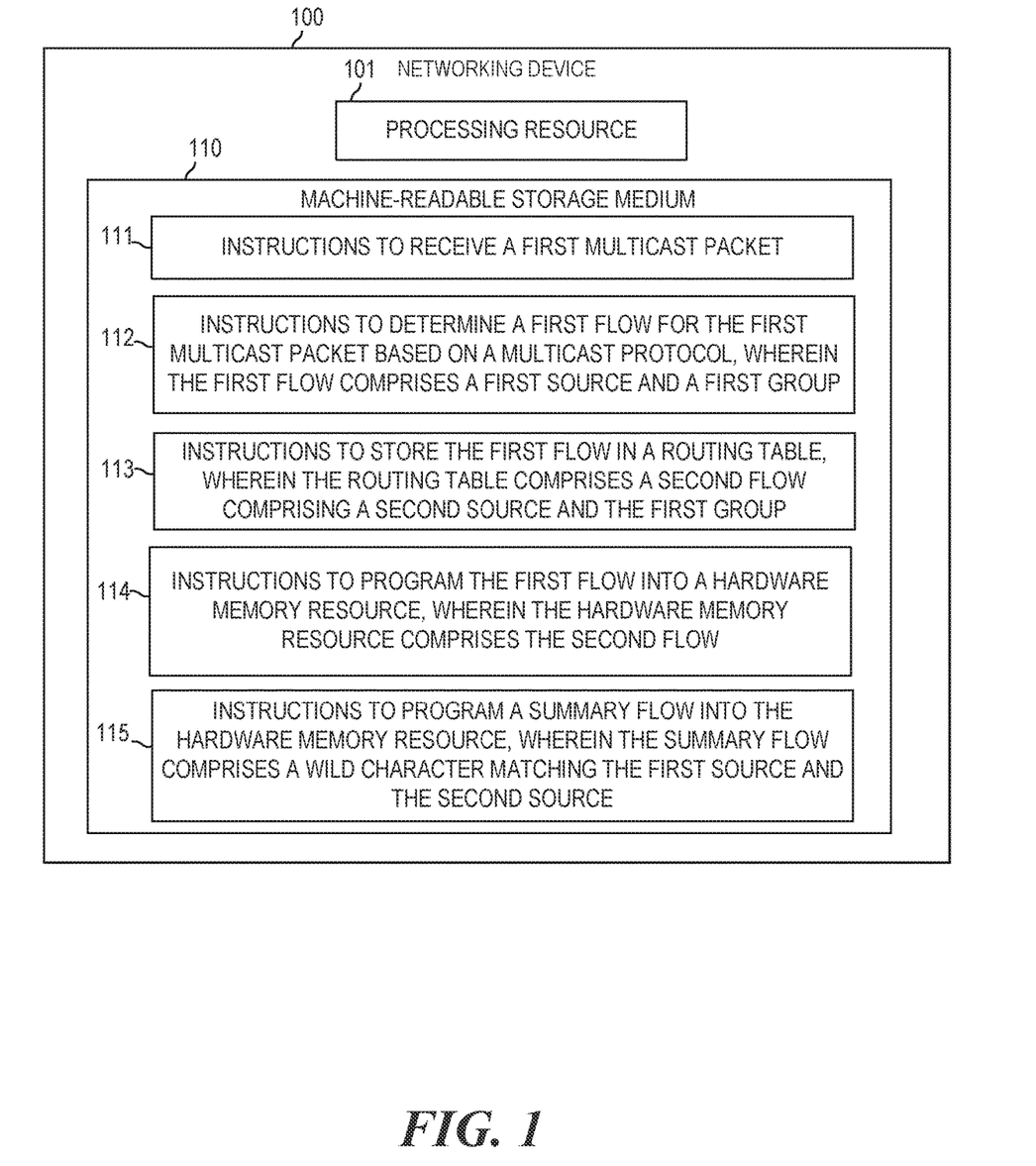
FIG. 1 is a block diagram of a networking device to program a summary flow into a hardware memory resource, according to some examples.

Referring now to the figures, FIG. 1 is a block diagram of a networking device 100 to program a summary flow into a hardware memory resource. As used herein, a networking device may be a device used in a network for the transmission of packets to the network (e.g. from an outside network), from the network (e.g. to an outside network), and/or within the network (from one device in the network to another device in the network). Non-limiting examples of a networking device include a router, switch, etc. Networking device 100 may be connected to other computing devices in the network. As used herein, a "computing device" may include a server, a networking device, a chipset, a desktop computer, a workstation, a mobile phone, a tablet, an electronic reader, or any other processing device or equipment.

Networking device 100 includes a processing resource 101 and a machine-readable storage medium 110. Machine readable storage medium 110 may be in the form of non-transitory machine-readable storage medium, such as suitable electronic, magnetic, optical, or other physical storage apparatus to contain or store information such as instructions 111, 112, 113, 114, 115, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

In the example of FIG. 1A, instructions 111, 112, 113, 114, and 115 are stored (encoded) on storage medium 110 and are executable by processing resource 101 to implement functionalities described herein in relation to FIG. 1. In some examples, storage medium 110 may include additional instructions, like, for example, the instructions to implement some of the functionalities described in relation to networking device 200 in FIG. 2 or switch 300 in FIG. 3. In other examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, 114, and 115 as described herein.

Instructions 111 may be executable by processing resource 101 to receive a first multicast packet. The packet may be sent from a computing device that has accessed the network that networking device 100 is connected to. In some examples, the computing device may be a laptop and the data in the packet may originate from an application running on the laptop. For example, an application may be determining printing services available on a local network. Upon accessing the network, the application may cause the computing device to send out a multicast packet for network service discovery. The multicast packet may be routed to networking device, which may then appropriately route the packet it based on the information in the multicast packet. As used herein, "first" and "second" are used to distinguish one multicast packet from another multicast packet. "First", "second", etc. may or may not coincide with the order of multicast packets received at the networking device. For example, the "first" multicast packet may be the third or the thirtieth multicast packet received by networking device 100.

Instructions 112 may be executable by processing resource 101 to determine a first flow for the first multicast packet based on a multicast protocol. Networking device 100 may comprise a programmable hardware resource, such as an Application Integrated Specific Circuit (ASIC) that is programmed to forward data packets received by the networking device. The ASIC may have a hardware memory resource that is separate from storage medium 110. In some examples, the hardware memory resource is machine-readable storage medium that is optimized to provide faster memory speeds than other types of memory. Such examples of a hardware memory resource include TCAM. Because the hardware memory resource is provided on the programmable hardware resource, space on the hardware memory resource may be limited.

Based upon a determination by multicast protocol that a certain type of data packet should take a certain path, the programmable hardware resource may be programmed accordingly, and future data packets received by the networking device that are of the same type may be handled (e.g., routed) by the data plane using the same path. This allows for the faster processing of packets. The flows may be kept on a table (e.g. a forwarding table) on the hardware memory resource of the programmable hardware resource.

However, the first time a type of multicast data is received, the hardware memory resource of the programmable hardware resource may not have an entry that matches the type of multicast packet in its forwarding table. Accordingly, those packets are missed and the multicast protocol may determine how they should be routed.

Thus, in some examples, in networking device 100, the first multicast packet may not have a matching entry in the hardware memory resource and instructions 112 may determine a first flow for the first multicast packet based on a multicast protocol. Some non-limiting examples of a multicast protocol include Simple Service Discovery Protocol (SSDP), Protocol Independent Multicast (PIM), etc.

In some examples, the flow may include an incoming interface (the interface of the networking device from where the packet enters), a source (the address for the device from which the packet originated), a group (the IP address of the multicast group that is subscribed to this flow), and outgoing interface(s) (the interface(s) of networking device 100 where the packet is sent from the networking device). The incoming interface, source, group, and outgoing interface of the first flow for the first multicast packet may all be characterized as "first." Thus, the first flow may comprise a first incoming interface, a first source, a first group, and a first outgoing interface. With a multicast protocol, the outgoing interface may include one or more interfaces. Accordingly, the outgoing interfaces associated with the first flow may be characterized as a first list of outgoing interfaces where the list may include one outgoing interface, two outgoing interfaces, etc.

Instructions 113 may be executable by processing resource 101 to store the first flow in a routing table. This routing table is kept by the multicast protocol and is different from the table that is stored by the programmable hardware resource. The routing table may already include other multicast flows determined by the multicast protocol. These other flows may be characterized as a second flow, third flow, etc. as to distinguish them from the first flow. In some examples, one or more of those already stored flows may be similar to the first flow. For example, an already stored flow (e.g., a second flow) may comprise the same incoming interface as the first flow, the same group as the first flow, and the same outgoing interfaces as the first flow. This second flow may however have a different source than the first source. As discussed below, the second flow may be considered a match for the first flow.

Instructions 114 may be executable by processing resource 101 to program the first flow, as determined by the multicast protocol, into the hardware memory resource of the programmable hardware resource. As used herein, "programming" a flow into the hardware memory resource includes writing the flow into the hardware memory resource such that it is accessible for packet forwarding processing. For example, this may include writing to an egress interface of an ASIC of networking device 100. As discussed above, the programmable hardware resource may store these flows in a table. In some examples, this table may be referred to as a forwarding table. The table of the programmable hardware resource may already have stored in it the second flow. The second flow comprises the first group, the first outgoing interface, and the first incoming interface but has a second source (i.e. the source of the second flow is different than the source of the first flow). Accordingly, after the programmable hardware resource is programmed with the first flow, it may receive a multicast packet that arrives at the networking device at the first interface, subscribes to the first group, and originates from the first source. The multicast packet will be processed by the directions of the first flow, meaning that it will leave the networking device 100 from the first outgoing interfaces. Additionally, the networking device may receive a multicast packet that arrives at the networking device at the first interface, subscribes to the first group, and originates from the second source by the directions of the second flow. This also means that it will leave the networking device from the first outgoing interfaces. Thus, these packets require two flow entries but follow the same path in the networking device.

Instructions 115 may be executable by processing resource 101 to program a summary flow in the programmable hardware resource. The summary flow is not a new flow determined by the multicast protocol based on a new multicast packet that is received. Rather, the summary flow may represent at least two flows that have already been determined by the multicast protocol. The flows that are represented by the summary flow are already programmed into the programmable hardware resource. In some examples, the flows that the summary flow represents have matching incoming interfaces, matching groups, and matching outgoing interfaces. The sources of the represented flows do not have to match.

For example, as discussed above, the programmable hardware resource may be programmed with a first flow and a second flow. The first flow may have a first incoming interface, a first group, a first source, and a first outgoing interface. The second flow may comprise an incoming interface that is the same as the first incoming interface, a group that is the same as the first group, and an outgoing interface that is the same as the first outgoing interface. The second flow may comprise, however, a second source different from the first source. Accordingly, a summary flow may represent the first flow and the second flow. The summary flow comprises the first incoming interface, the first group, and the first outgoing interface. For its source, the summary flow may comprise a wild character that allows the programmable hardware resource to match to any source (which includes the first source and the second source). In other words, the summary flow is agnostic as to the source of the multicast packet. Accordingly, a third multicast packet received by networking device 100 that enters networking device 100 by the first incoming interface from a third source and subscribing to the first group will "match" the summary flow and be processed by the rules of the summary flow without requiring a new flow for the third source.

In some examples, instructions 115 comprise instructions that are executable by processing resource 100 to determine whether flow entries in the routing table filled by the multicast protocol match each other. These instructions may do so by finding flows that have the same groups and the same incoming interfaces. These results can be stored in a source table that associates the number of matching flows to a pair of incoming interface and a group. For example, upon a determination of a new flow by the multicast protocol, a search can be done of the source table to determine whether there is an entry for a specific pairing of an incoming interface and group. Based on a determination that there is an entry in the source table, the count of the number of sources may be incremented. In some examples, the specific sources may be stored as well so that the source table may track the sources that have been attached to a specific pair of incoming interface and group. In some examples, a summary flow is programmed based on a determination that the number of sources associated to a specific pair and incoming interface has reached a predetermined threshold. That predetermined threshold may be based on the resources of the networking device. For example, the threshold may be higher in a system with bigger storage medium on the programmable hardware resource and may be lower in a system with a smaller storage medium on the programmable hardware resource.

In some examples, instructions 115 may comprise instructions that are executable by processing resource 101 to delete the flows that are represented by the summary flow from hardware memory resource of the programmable hardware resource. In the example discussed above with the first flow and the second flow, these flows are deleted from the programmable hardware resource.

Tables 1-4 provide examples of a forwarding table stored on a hardware memory resource of a programmable hardware resource. Table 1 comprises 5 flows. Each flow comprises an incoming interface, a source, a group, and at least one outgoing interface.

TABLE 1

| Flow | Incoming Interface | Source | Group | Outgoing Interface |
|---|---|---|---|---|
| 1 | vlan 10 | 10.10.10.1 | 239.1.1.1 | vlan20, vlan30, vlan40 |
| 2 | vlan 50 | 20.20.20.1 | 239.1.1.1 | vlan20, vlan30, vlan40 |
| 3 | vlan 60 | 10.10.10.1 | 239.1.1.2 | vlan20, vlan30 |
| 4 | vlan 10 | 20.20.30.2 | 239.1.1.1 | vlan20, vlan30, vlan40 |
| 5 | vlan 60 | 50.50.50.1 | 239.1.1.2 | vlan20, vlan30 |

Networking device 100 may receive a multicast packet, which may be characterized as a "first" multicast packet. A flow (a "first" flow) is determined by the multicast protocol, entered in the multicast protocol's routing table, and programmed into the forwarding table of the programmable hardware resource of networking device 100. Accordingly, Table 1 becomes Table 2, shown below with flow 6 (the "first" flow). Flow 6 has an incoming interface of vlan 10 (characterized as the first incoming interface), a source of 30.30.30.1 (characterized as the first source), a group of 239.1.1.1 (characterized as the first group), and outgoing interface of vlan20, vlan30, and vlan40 (characterized as the first list of outgoing interfaces). Flow 6 has a matching incoming interface, matching group, and matching outgoing interface with flows 1 and 4. Flow 6, flow 1, and flow 4 each have different sources. If Flow 1 is characterized as a "second" flow, its source may be characterized as a second source (10.10.10.1). If Flow 4 is characterized as a "third" flow, its source may be characterized as a third source (20.20.30.2). Flow 6 does not match flow 2 because it has a different incoming interface (even though flow 6 has the same group as flow 2). Flow 2's incoming interface may be characterized as a "second" incoming interface to distinguish it as being different from the incoming interface of flow 6.

TABLE 2

| Flow | Incoming Interface | Source | Group | Outgoing Interface |
|---|---|---|---|---|
| 1 | vlan 10 | 10.10.10.1 | 239.1.1.1 | vlan20, vlan30, vlan40 |
| 2 | vlan 50 | 20.20.20.1 | 239.1.1.1 | vlan20, vlan30, vlan40 |
| 3 | vlan 60 | 10.10.10.1 | 239.1.1.2 | vlan20, vlan30 |
| 4 | vlan 10 | 20.20.30.2 | 239.1.1.1 | vlan20, vlan30, vlan40 |
| 5 | vlan 60 | 50.50.50.1 | 239.1.1.2 | vlan20, vlan30 |
| 6 | vlan 10 | 30.30.30.1 | 239.1.1.1 | vlan20, vlan30, vlan40 |

Based on a determination that the predetermined threshold of flows are matching (in this example, the predetermined threshold is three), a summary flow may be programmed into the programmable hardware resource such that Table 2 becomes Table 3.

TABLE 3

| Flow | Incoming Interface | Source | Group | Outgoing Interface |
|---|---|---|---|---|
| 1 | vlan 10 | 10.10.10.1 | 239.1.1.1 | vlan20, vlan30, vlan40 |
| 2 | vlan 50 | 20.20.20.1 | 239.1.1.1 | vlan20, vlan30, vlan40 |
| 3 | vlan 60 | 10.10.10.1 | 239.1.1.2 | vlan20, vlan30 |
| 4 | vlan 10 | 20.20.30.2 | 239.1.1.1 | vlan20, vlan30, vlan40 |
| 5 | vlan 60 | 50.50.50.1 | 239.1.1.2 | vlan20, vlan30 |
| 6 | vlan 10 | 30.30.30.1 | 239.1.1.1 | vlan20, vlan30, vlan40 |
| 7 | vlan 10 | * | 239.1.1.1 | vlan20, vlan30, vlan40 |

Summary flow, shown as flow 7 in Table 3, has the incoming interface of flow 6 (the first incoming interface), the group of flow 6 (the first group), and the outgoing interface of flow 6 (the first list of outgoing interfaces). The source of summary flow is a wild character that matches multiple sources, such as the source of flow 1, flow 4, and flow 6.

Flow 1, flow 4, and flow 6 may be deleted from the forwarding table such that Table 3 becomes Table 4. Table 4 shows the new numbers of the flows with the old number of the flows in parentheticals. With the deletion of flow 1, flow 4, and flow 6 from table 3, in table 4, the summary flow (flow 7 from Table 3) becomes flow 4.

TABLE 4

| Flow | Incoming Interface | Source | Group | Outgoing Interface |
|---|---|---|---|---|
| 1 (2) | vlan 50 | 20.20.20.1 | 239.1.1.1 | vlan20, vlan30, vlan40 |
| 2 (3) | vlan 60 | 10.10.10.1 | 239.1.1.2 | vlan20, vlan30 |
| 3 (5) | vlan 60 | 50.50.50.1 | 239.1.1.2 | vlan20, vlan30 |
| 4 (7) | vlan 10 | * | 239.1.1.1 | vlan20, vlan30, vlan40 |

With flow 4 in forwarding table of the programmable hardware resource, networking device 100 may process multicast packets that used to be handled by flow 1 (in table 3), flow 4 (in table 3), and flow 6 (in table 3). For example, a new multicast packet received by networking device 100 that comes in through incoming interface vlan10, has a source from 10.10.10.1, and is for group 239.1.1.1 will be processed by summary flow (flow 4) of Table 4. Networking device 100 may also process multicast packets that match the incoming interface and group of the summary flow (flow 4). For example, a new multicast packet that comes in from incoming interface vlan 10, with a group of 239.1.1.1 and a source not in flow 1, flow 4, or flow 6 of Table 3. This new multicast packet will also be handled by the hardware programming device without the involvement of the multicast protocol as it will match the summary flow (flow 4 in Table 4).

In Table 4, flows 2 and 3 also match each other (as they have matching incoming interfaces and groups). However, in this example, they are not represented by a summary flow because the predetermined number of flows (3) has not been met. In other examples where the predetermined number of flows is lower, flows 2 and 3 may be represented by another summary flow and then deleted from the forwarding table.

Examples herein discuss a summary flow that represents a first flow and a second flow. This does not exclude the summary flow representing additional flows, for example, a third flow, a fourth flow, etc. with a similar incoming interface, similar group, and similar outgoing interface as the first flow. This means that the wild character may match the first source, the second source, as well as the third source, etc. In some examples, summary flows that represent a bigger amount of individual flows allow for a greater amount of conservation of hardware memory resources as compared to summary flows that represent a smaller amount of individual flows.

Accordingly, this allows for the conservation of space on the hardware memory resource of the programmable hardware resource without removing its packet processing functionality. This is because packets that would have been processed by either the first flow or the second flow are processed by the summary flow. In some examples, the flows represented in the summary flow are not deleted from the routing table. This allows the functionality of the multicast protocol to remain the same.

Figure 2:
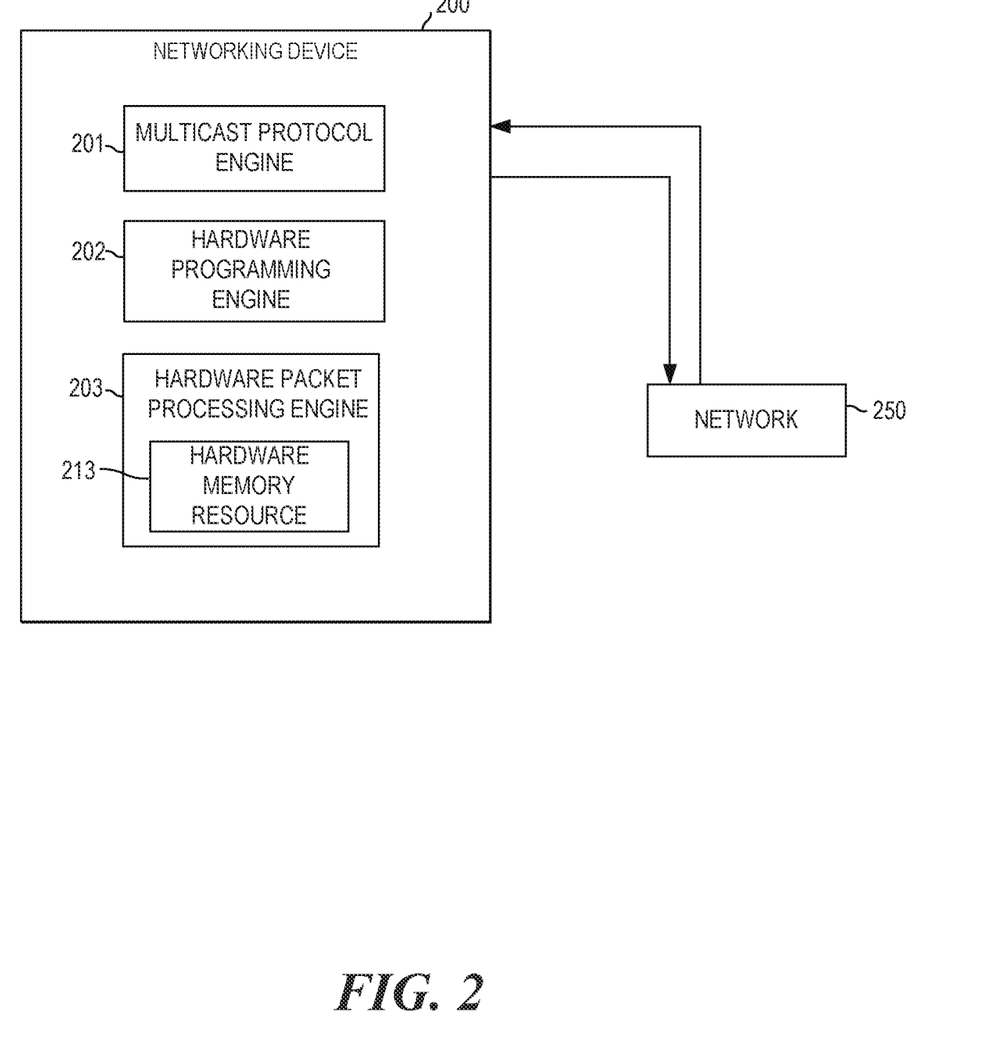
FIG. 2 is a block diagram of a networking device with a hardware programming engine to program a summary flow into a hardware memory resource, according to some examples.
Figure 3:
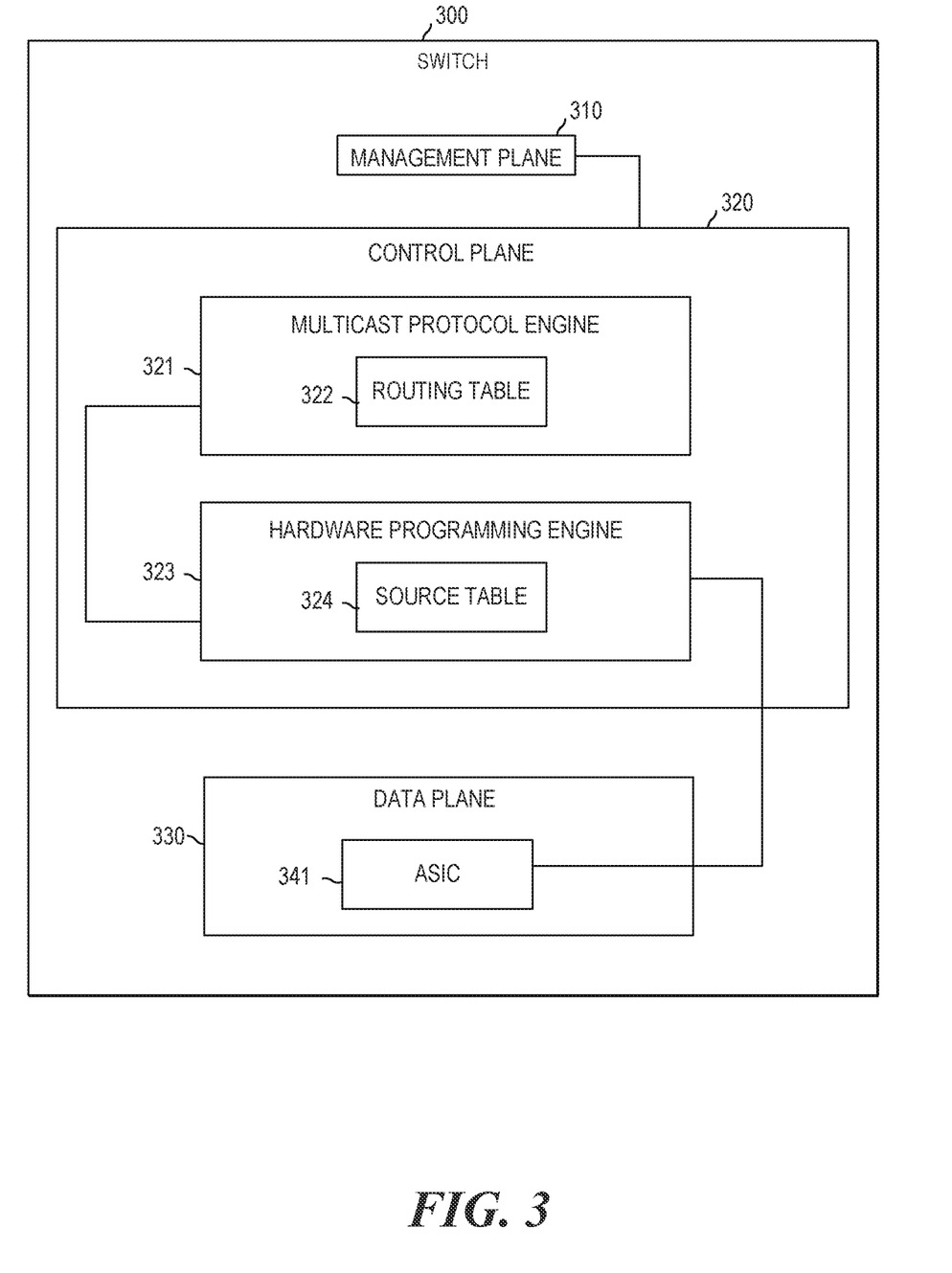
FIG. 3 is a block diagram of a networking device with a hardware programming engine to program a hardware memory resource of an application specific integrated circuit (ASIC), according to some examples.

Networking device 100 of FIG. 1, which is described in terms of processors and machine-readable storage mediums, can include one or more structural or functional aspects of networking device 200 of FIG. 2, or switch 300 of FIG. 3, which are described in terms of engines containing hardware and software.

FIG. 2 is a block diagram of a networking device 200 to program a hardware memory resource with a summary flow. Networking device 200 comprises multicast protocol engine 201, hardware programming engine 202, hardware packet processing engine 203, and hardware memory resource 213. Other engines may be added to networking device 200 for additional or alternative functionality. Hardware programming engine 202 may interface with hardware packet processing engine 203 and hardware memory resource 203 to program the hardware memory resource. Hardware memory resource 213 may comprise a high performing storage medium (e.g., a TCAM) that is physically closely located to hardware packet processing engine 2013. In some examples, hardware memory resource 213 is located on the hardware packet processing engine 203. Hardware memory resource 213 may store forwarding information that allows hardware packet processing engine 203 to process packets without the involvement of the multicast protocol engine 201.

Networking device 200 may be connected to network 250. Network 250 may comprise other computing devices, including networking devices 200 similar to networking device 200.

Each of engines 201, 202, and 203 may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, however, hardware packet processing engine 203 comprises an integrated circuit, for example, an ASIC, a field programmable gate array (FPGA), etc. that is designed for packet processing.

Each engine of networking 200 can include at least one machine-readable storage mediums (for example, more than one) and at least one computer processor (for example, more than one). For example, software that provides the functionality of engines on networking device can be stored on a memory of the networking device 200 to be executed by a processor of the networking device 200. As compared to the storage medium associated with multicast protocol engine 201 or hardware programming engine 202, hardware memory resource 213 may be more limited in space and higher in speed.

Multicast protocol engine 201 includes a combination of hardware and software that allows networking device 200 to receive a first multicast packet. In some examples, multicast protocol engine 201 may be an SSDP engine. SSDP may be used for network service discovery and network service broadcast. For example, an application on a computing device may send out an M-search message when it accesses the network to try to discover services available on the network. In some examples, the M-search message is a multicast packet. A computing device on the network that provides a service may also advertise its services to other devices on the network. In some examples, this advertisement message may also be a multicast packet.

Multicast protocol engine 201 also allows networking device 200 to determine a first flow for the first multicast packet. Multicast protocol engine 201 determines a flow for the first multicast packet in the situation where there is no flow matching the first multicast packet programmed in the hardware memory resource 213. As discussed above, the first flow may include fields such as an incoming interface, a source, a group, and at least one outgoing interface.

Multicast protocol engine 201 also allows networking device 200 to store the first flow in a routing table. The routing table is stored on a storage medium accessible to the multicast protocol engine 201 that is different and separate from the hardware memory resource 213. The routing table comprises paths that have been already determined by the multicast protocol engine 201, including a second flow that is similar to the first flow. The second flow may comprise an incoming interface, a source, a group, and at least one outgoing interface. Because its incoming interface matches the incoming interface of the first flow, it may be characterized as comprising the first incoming interface. Similarly, because its group matches the group of the first flow, the second flow may be characterized as comprising the first group. Also, because its outgoing interface matches the outgoing interface of the first flow, the second flow may be characterized as comprising the first outgoing interface. The source of the second flow is different from the source of the first flow, thus the second flow is characterized as comprising a second source. Multicast protocol engine 201 may interface with hardware programming engine 202 such that its flow determinations are communicated to hardware programming engine 202.

Accordingly, hardware programming engine 202 includes a combination of hardware and software that allows networking device 200 to program the first flow to hardware memory resource 213. For example, hardware programming engine 202 may interact with an egress interface of hardware memory resource 213 or hardware packet processing engine 203. At the time of programming, the second flow is already programmed on hardware memory resource 213. Accordingly, after programming the first flow, hardware memory resource 213 will have the first flow and the second flow programmed on it.

Hardware programming engine 202 also allows networking device 200 to keep track of the number of flows determined by multicast protocol engine 201 that have the same incoming interface and the same group. In other words, hardware programming engine 202 may determine that the first flow and the second flow have the same incoming interface and the same group and thus may be represented by a summary flow.

As discussed above, in some examples, this can accomplished by keeping track of the number of sources and the specific sources that are associated to an incoming interface and group in a source table. Upon multicast protocol engine 201 determining the first flow, hardware programming engine 202 may query the source table to determine whether a flow exists with this specific pairing of incoming interface and group. Based on a determination that there is an entry in the source table, then the count for the source may be incremented by one and/or the new source may be tracked. Based on the determination that the pair does not exist, then a new entry is created in the source table to track that there are flows having the specific pairing of incoming interface and group. The source table is not stored in the hardware memory resource 213 but is stored on a storage medium accessible to the hardware programming engine 202. In some examples, the determination that the first flow and the second flow may be represented by a summary flow is based on the first flow and the second flow having the same incoming interface, the same group, and the same outgoing interface(s). In these examples, the source table keeps track of what sources and the number of sources associated to a specific combination of a group, incoming interface, and outgoing interface.

Hardware programming engine 202 may program the summary flow to the hardware memory resource 213. The summary flow may comprise the first incoming interface, the first group, and the first outgoing interface(s). The summary flow may also comprise a wild character that matches at least the first source and the second source. In some examples, the wild character may match any source (i.e. the summary flow is agnostic to the source).

Hardware programming engine 202 may delete the first flow and the second flow from the hardware memory resource 213, In some examples, the deletion is done after the summary flow is programmed into hardware memory resource 213. Hardware programming engine 202 may also determine that other flows programmed into hardware memory resource 213 matches the summary flow and delete those flows as well from hardware memory resource 213.

Hardware packet processing engine 203 includes a combination of hardware and software that allows networking device 200 to efficiently process multicast packets received without the involvement of multicast protocol engine 201. In some examples, hardware packet processing engine 203 comprises an ASIC.

Upon the arrival of a new multicast packet, hardware packet processing engine 203 may determine whether the multicast packet may be processed by the flows programmed on hardware memory resource 213. Based on a determination that the new multicast packet can be processed by a flow, the packet is processed by that flow without the need to involve multicast protocol engine 201. For example, networking device 200 may receive a new multicast packet from the first incoming interface and that subscribes to the first group, Hardware packet processing engine 203 determines that this new multicast packet matches the summary flow programmed in hardware memory resource 213 and processes it based on that summary flow. Because the summary flow has a wild character that matches any source, the source of the new multicast packet does not go into the determination of whether the new multicast packet matches the summary flow. Accordingly, the new multicast packet is processed by the summary flow and leaves the networking deice by the first outgoing interface.

Networking device 200 of FIG. 2, which is described in terms of engines containing hardware and software, can include one or more structural or functional aspects of networking device 100 of FIG. 1, or switch 300 of FIG. 3.

FIG. 3 is a block diagram of a switch 300. Switch 300 conceptually comprises a management plane 310, a control plane 320, and a data plane 330. Switch 300 may be connected to a network (now shown in FIG. 3). Management plane 310 may be used by an administrator of the network to manage switch 300 including setting configurations using a command-line interface (CLI), a graphical user interface (GUI), etc.

Control plane 320 comprises components that are used for the determination of packet flows through switch 300. Control plane 320 may comprise multicast protocol engine 321 and a hardware programming engine 323.

Multicast protocol engine 321 is similar to multicast protocol engine 201 and comprises routing table 322. Routing table 322 may store flows for multicast packets that are determined by the multicast protocol engine 321 based on the multicast protocol engine's knowledge of its networking environment (e.g., its neighbors, network conditions, etc.). These flows may be programmed into data plane 330 on ASIC 341 such that packets may be processed the next time a similar packet is received without involving multicast protocol engine 321.

Hardware programming engine 323 is similar hardware programing engine 202 and comprises source table 324, Source table 324 may keep track of how many sources are associated with a specific pair of incoming interface and group. In some examples, when there are a predetermined amount of sources associated with a specific pair of incoming interface and group, hardware programming engine 323 may program a summary flow that represents those flows into the data plane 330 and delete those flows from the data plane 330, leaving additional space on the ASIC 341 for different flows.

Data plane 330 may comprise ASIC 341 which may comprise a hardware memory resource (not pictured in FIG. 3) to store flows in a forwarding table. Future data packets received by switch 300 that are of the same type may be handled (e.g., routed) by the data plane using the same path. This allows components in the control plane to focus on other processing matters. Additionally, packets that match the summary flow will be processed by the summary flow. The match of a packet with a summary flow comprises matching the incoming interface and the group of the packet with the summary flow. The summary flow comprises a wild character for the source field, such that any source may be captured by the summary flow.

Switch 300, which is described in terms of engines containing hardware and software, can include one or more structural or functional aspects of networking device 100 of FIG. 1 or networking device 200 of FIG. 2.

Figure 4:
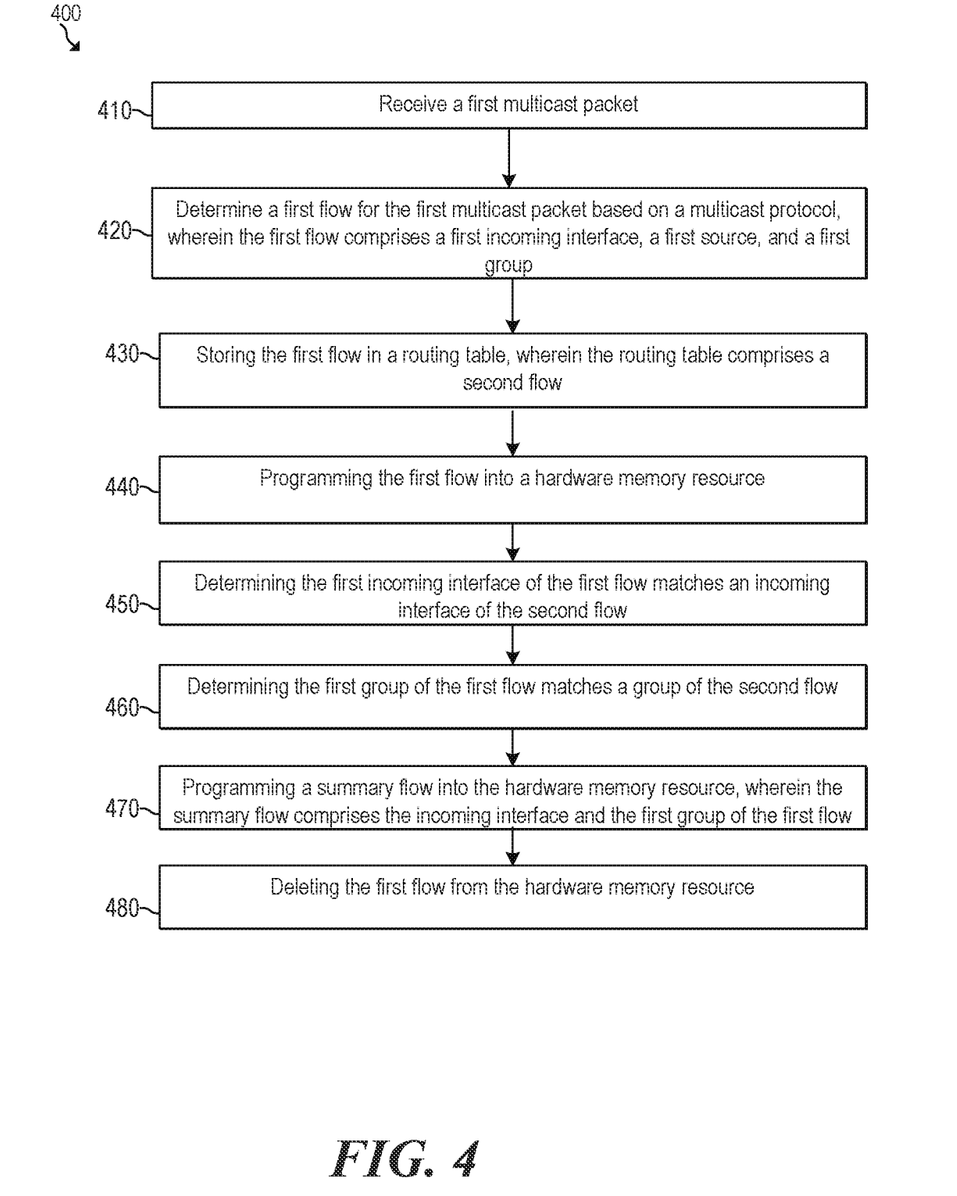
FIG. 4 is a block diagram of a method of programming a summary flow into a hardware memory resource, according to some examples.

FIG. 4 illustrates a flowchart for a method 400 to determine that flows belong in a summary flow. Although execution of method 400 is described below with reference to networking device 200, other suitable devices for execution of method 400 may be used (e.g., networking device 100 of FIG. 1, switch 300 of FIG. 3, etc.).

At 410, multicast protocol engine 201 receives a first multicast packet. In some examples, the multicast packet may be an M-search packet of SSDP.

At 420, multicast protocol engine 201 determines a first flow for the first multicast packet based on a multicast protocol. In some examples, the multicast protocol may be SSDP. The first flow may comprise a first incoming interface, a first source, a first group, and a first of outgoing interfaces. At 430, multicast protocol engine 201 stores the first flow in a routing table of multicast protocol engine 201. The routing table may already comprise other flows previously determined by the multicast protocol engine 201. One of these flows may be a second flow. The second flow comprises an incoming interface, a source, a group, and at least one outgoing interface.

At 430, hardware programming engine 202 programs the first flow into hardware memory resource 213. The hardware memory resource 213 is already programmed with the second flow. At 440, hardware programming engine 202 determines that the first incoming interface of the first flow matches an incoming interface of the second flow. In other words, the incoming interface of the second flow is the same as the incoming interface of the first flow. At 450, hardware programming engine 202 determines that the first group of the first flow matches a group of the second flow. In other words, the group of the second flow is the same as the first group of the first flow. In some examples, hardware programming engine 202 also determines that the list of outgoing interfaces of the first flow is the same as the list of outgoing interfaces of the second flow. Based on these three items matching, hardware programming engine 202 may determine that the first flow and the second flow may be represented by a summary flow.

At 470, hardware programming engine 202 programs a summary flow into hardware memory resource 213. The hardware programming engine 202 may determine the incoming interface of the summary flow by using the matching first incoming interface of the first and second flows. The hardware programming engine 202 may determine the group of the summary flow by using the matching group of the first and second flows. The hardware programming engine 202 may determine the outgoing interface by using the matching outgoing interface of the first and second flows. Accordingly, the summary flow comprises the incoming interface, group, and outgoing interface of the first flow. Hardware programming engine 202 uses a wild character for the source field of the summary flow.

At 480, hardware programming engine 202 deletes the first flow from hardware memory resource 213. In some examples, hardware programming engine 202 deletes the second flow from hardware memory resource 213. In some examples, the deletion is done after the programming of the summary flow into hardware memory resource 213. In some examples, the first flow and the second flow are not changed in the routing table of multicast protocol engine 201.

Although the flowchart of FIG. 4 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
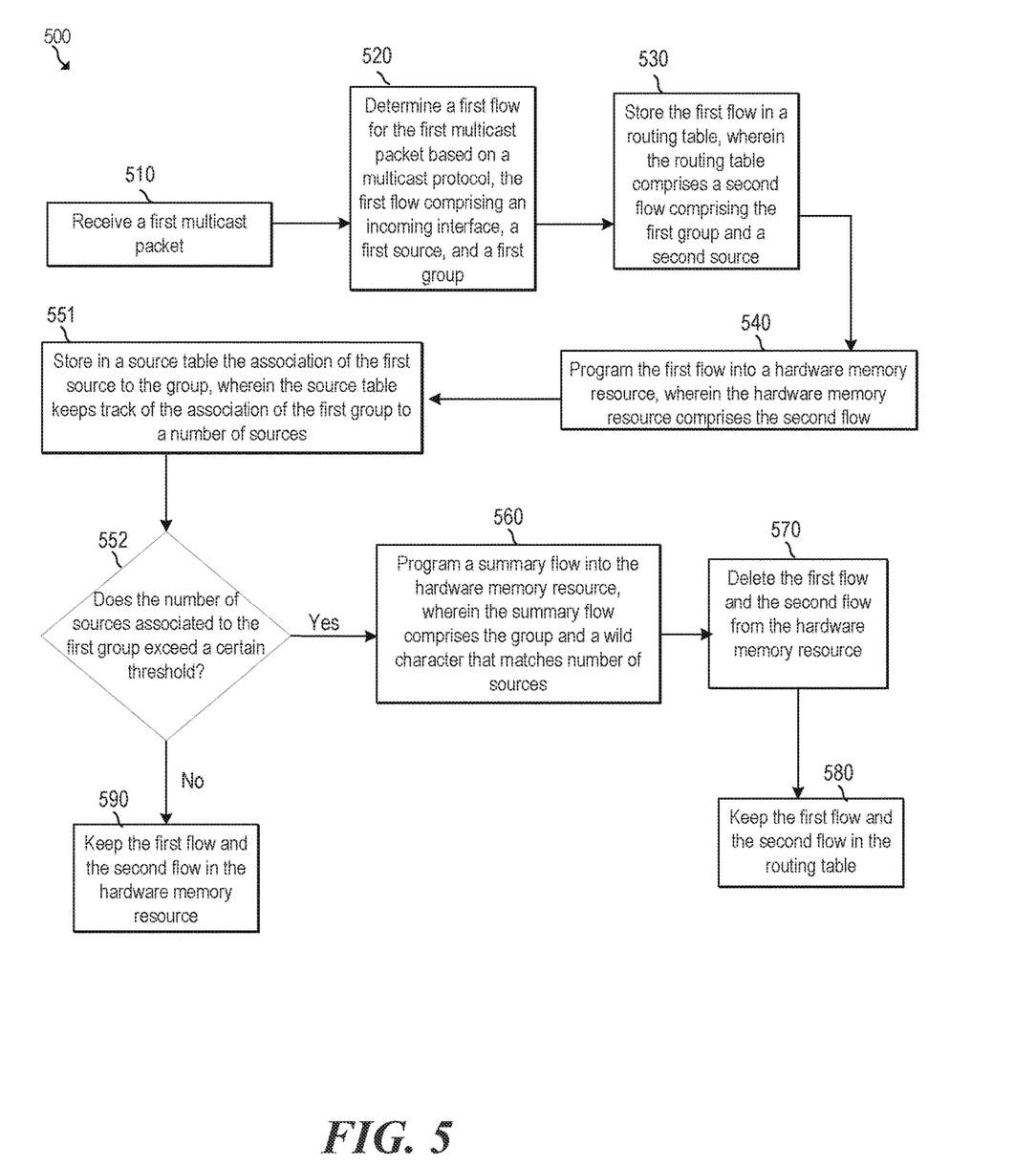
FIG. 5 is a block diagram of a method of determining when a summary flow is to be programmed into an ASIC, according to some examples.

FIG. 5 illustrates a flowchart for a method 500 of determining when a summary flow is to be programmed into a programmable hardware resource. Although execution of method 500 is described below with reference to switch 300, other suitable devices for execution of method 400 may be used (e.g., networking device 100 of FIG. 1, networking device 200 of FIG. 2, etc.).

At 510, multicast protocol engine 321 receives a multicast packet. This may be characterized as a first multicast packet. At 520, multicast protocol engine 321 determines a first flow for the first multicast packet based on a multicast protocol. The flow comprises a first incoming interface, a first source, a first group, and a first list of outgoing interfaces. At 530, multicast protocol engine 321 stores the first flow in routing table 322. Routing table 322 may already comprise other flows previously determined by multicast protocol engine 321 including flows that include fields that match the fields of the first flow. One of these matching flows may be characterized as a second flow. The second flow may include an incoming interface that is the same as the first incoming interface, a group that is the same as the first group, and a list of outgoing interfaces that is the same as the first list of outgoing interfaces. Accordingly, the second flow may be characterized as comprising the first incoming interface, the first group, and the first list of outgoing interfaces. The second flow may comprise a source that is different from the first source. Accordingly, the second flow may be characterized by comprising a second source.

At 540, hardware programming engine 323 may program the first flow into ASIC 341 which comprises a hardware memory resource. The hardware memory resource may already be programmed with the second flow.

At 551, hardware programming engine 323 may store in source table 324 the association of the first source to the first group and the first incoming interface. The source table 324 may keep track of which sources are associated with which group, incoming interface pair. For example, source table 324 may already have stored that the first group and the first incoming interface are associated to the second source, since that relationship was dictated by the second flow and the second flow was determined by multicast protocol engine before the first flow was determined. In some examples, the source table may also track outgoing interfaces as well. In these examples, the association would be the first source to the triplet of (first group, the first incoming interface, and the first list of outgoing interfaces). In these examples, the first flow would have to match the second flow in the incoming interface, group, and outgoing interface(s) to be considered a match.

At 552, hardware programming engine 323 determines whether the number of sources associated to the (group, incoming interface) pair exceeds a certain predetermined threshold. Based on a determination that the number of sources is at or below the certain predetermined threshold, method 500 moves to 590. At 590, hardware programming engine 323 keeps the first flow and the second flow in the hardware memory resource in ASIC 341. This is because there is not enough flows for a summary flow to be programmed.

Based on a determination that the number of sources is above the certain predetermined threshold, method 500 moves to 560. At 560, hardware programming engine 323 programs a summary flow into ASIC 341. The summary flow comprises the first incoming interface, the first group, and the first list of outgoing interfaces. The summary flow comprises a wild character that matches the number of sources previously associated at step 552.

At 570, hardware programming engine deletes the first flow and the second flow from ASIC 341. At 580, multicast protocol engine 231 keeps the first flow and the second flow in routing table 322. In other words, the function of multicast protocol engine is unchanged by the summarization of the flows in ASIC 341.

Although the flowchart of FIG. 5 shows a specific order of performance of certain functionalities, method 500 is not limited to that order. For example, some of the functionalities shown in succession may be performed in a different order, may be executed concurrently or with partial concurrence, or a combination thereof. In some examples, functionalities described herein in relation to FIG. 5 may be provided in combination with functionalities described herein in relation to any of FIGS. 1-4. Method 500 may also comprise additional steps not shown.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions, that when executed, cause a processing resource to:
   receive a first multicast packet;
   determine a first flow for the first multicast packet based on a multicast protocol, wherein the first flow comprises a first source and a first group;
   store the first flow in a routing table, wherein the routing table comprises a second flow comprising a second source and the first group;
   program the first flow into a hardware memory resource, wherein the hardware memory resource comprises the second flow;
   program a summary flow into the hardware memory resource, wherein the summary flow comprises a wild character matching the first source and the second source;
   receive a second multicast data packet;
   determine that the second multicast data packet matches the summary flow in the hardware memory resource; and
   process the second multicast data packet according to the summary flow.

2. The non-transitory machine-readable storage medium of claim 1, comprising instructions, that when executed, cause the processing resource to:
   delete the first flow from the hardware memory resource.

3. The non-transitory machine-readable storage medium of claim 2, comprising instructions, that when executed, cause the processing resource to:
   maintain the first flow in the routing table.

4. The non-transitory machine-readable storage medium of claim 1, wherein the summary flow comprises the first group.

5. The non-transitory machine-readable storage medium of claim 1, wherein the first flow comprises a first incoming interface and the second flow comprises the first incoming interface.

6. The non-transitory machine-readable storage medium of claim 5, wherein the summary flow comprises the first incoming interface.

7. The non-transitory machine-readable storage medium of claim 1, wherein the first flow comprises an outgoing interface, the second flow comprises the outgoing interface, and the summary flow comprises the outgoing interface.

8. A networking device comprising:
   a multicast protocol engine to:
      receive a first multicast packet;
      determine a first flow for the first multicast packet, wherein the first flow comprises a first group; and
      store the first flow in a routing table, wherein the routing table comprises a second flow comprising the first group;
   a hardware memory resource; and
   a hardware programming engine to:
      program the first flow in the hardware memory resource;
      determine a summary flow for the first flow and the second flow;
      program the summary flow to the hardware memory resource; and
      delete the first flow in the hardware memory resource after programming the summary flow to the hardware memory resource.

9. The networking device of claim 8, wherein the hardware programming engine is to delete the second flow from the hardware memory resource after programming the summary flow in the hardware memory resource.

10. The networking device of claim 8,
    wherein the first flow comprises a first source;
    wherein the second flow comprises a second source; and
    wherein the summary flow comprises a wild character representing the first source and the second source.

11. The networking device of claim 8, wherein the first flow is not programmed in the hardware memory resource before the first multicast packet is received.

12. The networking device of claim 8, comprising a hardware packet processing engine,
    wherein the multicast protocol engine is to receive a second multicast data packet; and
    wherein the hardware processing engine is to:
       determine that the second multicast data packet matches the summary flow in the hardware memory resource; and
       process the second multicast data packet according to the summary flow.

13. The networking device of claim 8,
wherein the first flow comprises an incoming interface and an outgoing interface;
wherein the second flow comprises the incoming interface and the outgoing interface; and
wherein the summary flow comprises the incoming interface and the outgoing interface.

14. A method comprising:
receiving a first multicast packet;
determine a first flow for the first multicast packet based on a multicast protocol, wherein the first flow comprises an incoming interface, a first source, and a first group;
storing the first flow in a routing table, wherein the routing table comprises a second flow;
programming the first flow into a hardware memory resource;
determining the incoming interface of the first flow matches an incoming interface of the second flow;
determining the first group of the first flow matches a group of the second flow;
programming a summary flow into the hardware memory resource, wherein the summary flow comprises the incoming interface of the first flow and the first group; and
deleting the first flow from the hardware memory resource after programming the summary flow into the hardware memory resource.

15. The method of claim 14, comprising keeping the first flow in the routing table.

16. The method of claim 14, wherein the programming of the summary flow into the hardware resource is based upon a number of flows in the routing table reaching a predetermined threshold.

17. The method of claim 14, comprising:
receiving a second multicast packet;
determining the second multicast packet matches the group flow; and
processing the second multicast packet according to the group flow.

18. The method of claim 14, wherein the multicast protocol is SSDP (Simple Service Discovery Protocol).

* * * * *